United States Patent
Ke et al.

(10) Patent No.: US 9,976,233 B2
(45) Date of Patent: May 22, 2018

(54) RECYCLING METHOD OF WASTE FISHNET

(71) Applicants: Han-Che Ke, Changua County (TW); Yu-Cheng Ke, Changhua County (TW)

(72) Inventors: Han-Che Ke, Changua County (TW); Yu-Cheng Ke, Changhua County (TW)

(*) Notice: Subject to any disclaimer, the term of this patent is extended or adjusted under 35 U.S.C. 154(b) by 36 days.

(21) Appl. No.: 15/372,850

(22) Filed: Dec. 8, 2016

(65) Prior Publication Data
US 2017/0088686 A1 Mar. 30, 2017

Related U.S. Application Data

(63) Continuation-in-part of application No. 14/076,153, filed on Nov. 8, 2013.

(51) Int. Cl.
| | |
|---|---|
| D01D 5/00 | (2006.01) |
| C08J 11/06 | (2006.01) |
| B29B 9/10 | (2006.01) |
| B29B 9/16 | (2006.01) |
| B29B 13/06 | (2006.01) |
| B29C 47/00 | (2006.01) |
| B29B 17/04 | (2006.01) |
| D01D 1/00 | (2006.01) |
| C08L 77/02 | (2006.01) |
| D01F 6/60 | (2006.01) |
| D01F 6/90 | (2006.01) |

(Continued)

(52) U.S. Cl.
CPC .......... *D01D 5/00* (2013.01); *B29B 9/10* (2013.01); *B29B 9/16* (2013.01); *B29B 13/065* (2013.01); *B29B 17/0412* (2013.01); *B29C 47/0014* (2013.01); *C08J 11/06* (2013.01); *C08L 77/02* (2013.01); *D01D 1/00* (2013.01); *D01F 6/60* (2013.01); *D01F 6/90* (2013.01); *B29B 2009/165* (2013.01); *B29B 2017/0015* (2013.01); *B29B 2017/0021* (2013.01); *B29B 2017/042* (2013.01); *B29D 99/0078* (2013.01); *B29K 2105/26* (2013.01); *C08J 2377/02* (2013.01); *C08J 2477/06* (2013.01); *D10B 2331/021* (2013.01); *D10B 2501/021* (2013.01)

(58) Field of Classification Search
USPC ........................................................ 521/49.8
See application file for complete search history.

(56) References Cited

U.S. PATENT DOCUMENTS

| | | | |
|---|---|---|---|
| 5,535,945 | A | 7/1996 | Sferrazza et al. |
| 5,722,603 | A | 3/1998 | Costello et al. |

(Continued)

OTHER PUBLICATIONS

Dagli, S. S., et al. "Development of recycling technology for plastic fishing gear—a materials evaluation." Advances in Polymer Technology 10.2 (Aug. 1990): 125-134.

*Primary Examiner* — Benjamin A Schiffman
(74) *Attorney, Agent, or Firm* — Muncy, Geissler, Olds & Lowe, P.C.

(57) ABSTRACT

A recycling method of waste fishnet is provided. The waste fishnet is processed with steps of cutting, removing impurities, cleaning, and drying to form fishnet chips. The recycling method of waste fishnet includes the following steps. The fishnet chips are mixed with nylon-66, wherein the fishnet chips are of 70% by weight, and nylon-66 is of 30% by weight. The mixture is heated and molten. The molten mixture is then processed with the step of granulation. The grains are then processed with the step of spinning Thereby, the waste fishnet can be recycled and transferred into useful plastic materials.

10 Claims, 3 Drawing Sheets

(51) Int. Cl.
   *B29K 105/26* (2006.01)
   *B29D 99/00* (2010.01)
   *B29B 17/00* (2006.01)

(56) References Cited

U.S. PATENT DOCUMENTS

| | | |
|---|---|---|
| 9,023,903 B2 | 5/2015 | Lima |
| 2004/0249001 A1 | 12/2004 | Leboeuf |
| 2009/0082476 A1 | 3/2009 | Hoover, Jr. et al. |

RECYCLING METHOD OF WASTE FISHNET

The present invention is a CIP of application Ser. No. 14/076,153, filed Nov. 8, 2013, the entire contents of which are hereby incorporated by reference.

BACKGROUND OF THE INVENTION

Field of the Invention

Description of the Prior Art

Usually, fishnets are made of nylon-6, and nylon-6 has good mechanical intensity, high softening point and durability of heat, oil, acid and base; also, it has characteristics which can facilitate processing. However, after being used for years, fishnets are oxidized or cracked due to being immersed in seawater or exposed to sunlight for a long time, and the structural intensity will be weakened.

Therefore, fishnets become consumable. A large quantity of fishnets is abandoned, and thus it is not eco-friendly. In addition, a large amount of dirt, waterweed, shell and garbage is stuck in waste fishnets, so waste fishnets are difficult to be recycled. Besides, even if waste fishnets are recycled, the insufficient mechanical characteristic such as structural strength of the recycled nylon-6 makes it hard to be reused.

The present invention is, therefore, arisen to obviate or at least mitigate the above-mentioned disadvantages.

SUMMARY OF THE INVENTION

The main object of the present invention is to provide a recycling method of waste fishnet so as to effectively recycle waste fishnets and remanufacture the waste fishnets into other articles.

To achieve the above and other objects, the present invention provides a recycling method of waste fishnet, including the following steps.

Roughly cutting waste fishnet; removing large impurities in the waste fishnet; chopping the waste fishnet; cleaning the chopped waste fishnet with sodium hydroxide solution which is composed of 5-20 wt % of sodium hydroxide and 95-80 wt % of water; drying the cleaned waste fishnet to form fishnet chips; melting the fishnet chips; sieving impurities; granulating the molten fishnet chips to form fishnet granules; mixing the fishnet granules and nylon-66 together, wherein the fishnet granules are of 70% to 99.9% by weight, and the nylon-66 is of 0.1% to 30% by weight; melting the mixed fishnet granules and nylon-66; sieving impurities through meshes with scale between 200 mesh to 600 mesh; cooling the mixed fishnet granules and nylon-66 with water; granulating the fishnet granules and nylon-66 to form grains; crystallization by cooling the grains to ambient temperature; drying the grains; evacuation to the grains; spinning the grains produced in the step of granulating.

Thereby, the present invention can process the waste fishnets in advance and add proper materials to allow the grains to be manufactured into useful recycled materials.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
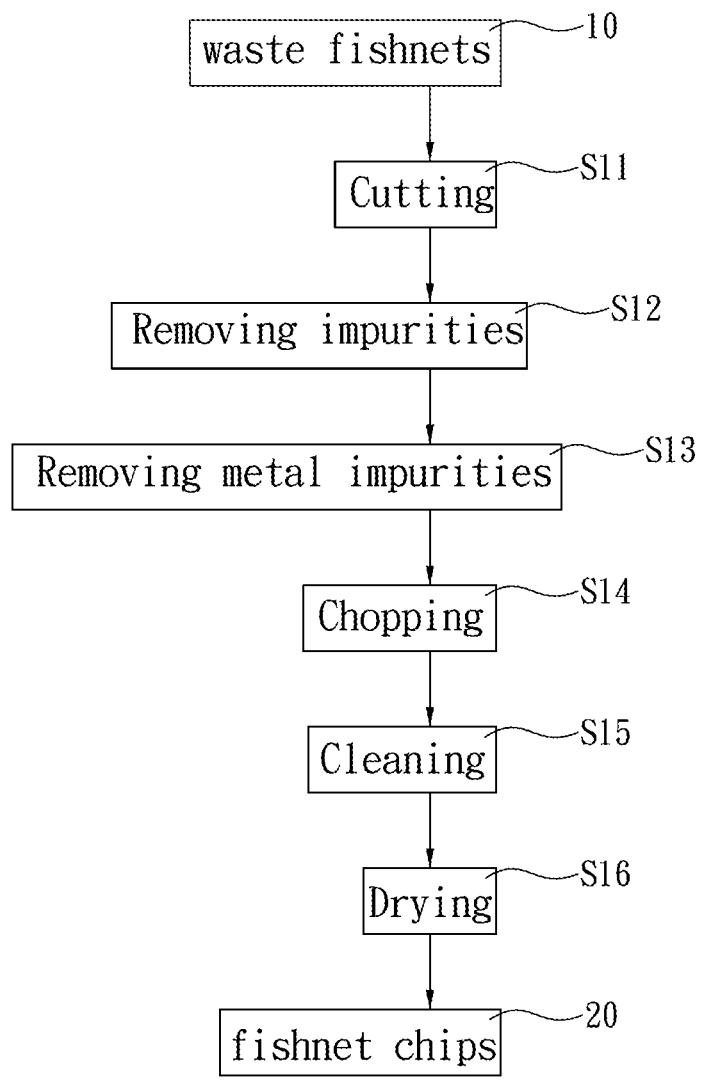
FIG. 1 is a part of a flow chart of the present invention.
Figure 1A:
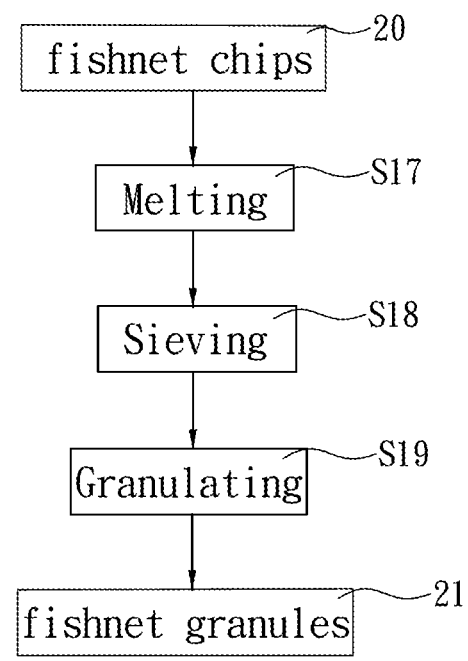
FIG. 1A is a part of a flow chart of the present invention.
Figure 2:
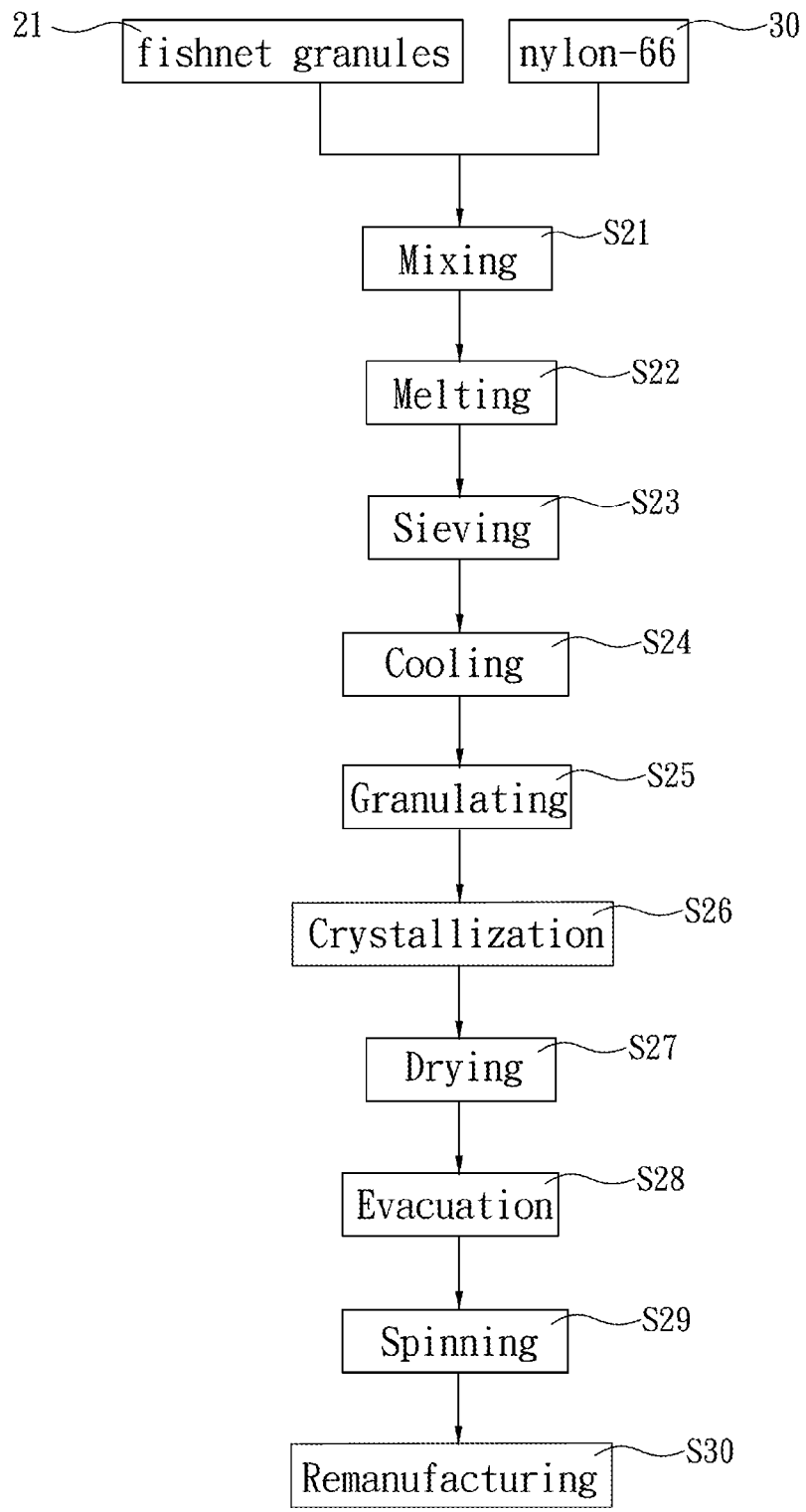
FIG. 2 is a part of the flow chart of the present invention.

Please refer to FIGS. 1, 1A and 2 for a recycling method of waste fishnet of the present invention, including the following steps.

Cutting S11: roughly cutting waste fishnets 10 to make the following steps like removing impurities easier, wherein the waste fishnets 10 are composed of nylon-6.

Removing impurities S12: removing large impurities such as shell, garbage, waterweed, dirt and others in the waste fishnets 10. In the main embodiment, this step is carried out via human eye.

Removing metal impurities S13: metallic materials are detected by a metal detector and are removed; thereby, the metallic materials which are not completely removed in the previous step will be removed so as to prevent the metallic materials from causing mechanical damage in the following steps.

Chopping S14: further chopping the waste fishnets 10, and preferably, using a machine to chop the waste fishnets 10 into shreds whose diameters are smaller than 10 mm.

Cleaning S15: cleaning the chopped waste fishnets 10, and preferably, washing away sand or dirt via a drum washing machine The chopped waste fishnets 10 are washed by sodium hydroxide solution which is composed of 5-20 wt % of sodium hydroxide and 95-80 wt % of water so as to clean the chopped waste fishnet 10 thoroughly.

Drying S16: drying the cleaned waste fishnets 10 to form fishnet chips 20; and preferably, dewatering the cleaned fishnets 10 through centrifugation and drying them in a drying oven to form the fishnet chips 20 which can be stored in a hopper for later use.

Melting S17: melting the fishnet chips 20;
Sieving S18: sieving the impurities.
Granulating S19: granulating the molten fishnet chips 20 to form fishnet granules 21.

Mixing S21: mixing the fishnet granules 21 with nylon-66 30, wherein the fishnet granules 21 are of 70% by weight, and nylon-66 30 is of 30% by weight; preferably, the fishnet granules 21 occupy 70% of the total weight, and the nylon-66 30 occupies 30% of the total weight. In addition, the nylon-66 30 can be acquired from waste airbags or waste parachutes.

Melting S22: melting the mixed fishnet granules 21 and nylon-66 30. The step of mixing S21 and the step of melting S22 can be processed almost at the same time.

Sieving S23: sieving impurities through meshes, wherein the sizes of the meshes are between 200 to 600 mesh.

Cooling S24: cooling the molten fishnet granules 21 and nylon-66 30 with water.

Granulating S25: granulating the molten fishnet granules 21 and nylon-66 30 to form grains.

Crystallization S26: cooling the grains to ambient temperature.

Drying S27: drying the grains.

Evacuation S28: place the grains in a vacuum room for evacuation to prevent the oxidation of the grains.

Spinning S29: spinning grains produced in the step of granulating S24, and preferably, spinning with an area of 400 mesh.

Remanufacturing S30: the plastic raw material produced in the previous step can be manufactured into other plastic products.

More specifically, the viscosity of waste fishnets composed of nylon-6 is only 1.8~2.35 dl/g, so the waste fishnets are not suitable for spinning. In contrast, the viscosity of new nylon-6 can reach 2.45 dl/g, so new nylon-6 is suitable for spinning. Therefore, recycled waste fishnets cannot be spun and remanufactured directly. In the present invention, nylon-66 with viscosity of 3 dl/g is mixed and melted with waste fishnets in a specific ratio so as to make waste fishnets suitable for spinning and remanufacturing, in which the viscosity of the mixture of waste fishnets and nylon-66 can reach beyond 2.45 dl/g, so the mixture is suitable for spinning. Besides, when the viscosity of waste fishnets changes, the mixing ratio of the present invention can be adjusted to allow the viscosity of the mixture to reach approximately 2.45 dl/g so as to meet the requirement of spinning.

Given the above, waste fishnets can be effectively recycled, and waste fishnets as the base material are added with nylon-66 to gain enforcement, thus avoiding the problem with that the material manufactured by recycled waste fishnets will have insufficient mechanical strength and be too weak to be used. Moreover, nylon-66 can be acquired from wastes, so the recycling method of waste fishnet is low-cost and environmental-friendly.

What is claimed is:

1. A recycling method of waste fishnet, waste fishnet being processed in advance with steps of cutting, removing impurities, cleaning and drying to form fishnet chips, the recycling method of waste fishnet including:
    melting the fishnet chips;
    sieving impurities;
    granulating the molten fishnet chips to form fishnet granules;
    mixing the fishnet granules and nylon-66 together, wherein the fishnet granules are of 70% to 99.9% by weight, and the nylon-66 is of 0.1% to 30% by weight;
    melting the mixed fishnet granules and nylon-66;
    cooling the mixed fishnet granules and nylon-66 with water;
    granulating the molten fishnet granules and nylon-66 to form grains;
    crystallization by cooling the grains to ambient temperature;
    drying the grains;
    evacuation to the grains;
    spinning the grains produced in the step of granulating.

2. The recycling method of waste fishnet of claim 1, wherein during the step of mixing, the fishnet granules are of 70% by weight, and nylon-66 is of 30% by weight.

3. The recycling method of waste fishnet of claim 1, wherein the waste fishnet is composed mainly of nylon-6.

4. The recycling method of waste fishnet of claim 1, wherein nylon-66 is acquired from waste airbags or waste parachutes.

5. A recycling method of waste fishnet, including the following steps:
    roughly cutting waste fishnet;
    removing large impurities in the waste fishnet;
    chopping the waste fishnet;
    cleaning the chopped waste fishnet with sodium hydroxide solution which is composed of 5-20 wt % of sodium hydroxide and 95-80 wt % of water;
    drying the cleaned waste fishnet to form fishnet chips;
    melting the fishnet chips;
    sieving impurities;
    granulating the molten fishnet chips to form fishnet granules;
    mixing the fishnet granules and nylon-66 together, wherein the fishnet granules are of 70% to 99.9% by weight, and the nylon-66 is of 0.1% to 30% by weight;
    melting the mixed fishnet granules and nylon-66;
    sieving impurities through meshes with scale between 200 mesh to 600 mesh;
    cooling the mixed fishnet granules and nylon-66 with water;
    granulating the fishnet granules and nylon-66 to form grains;
    crystallization by cooling the grains to ambient temperature;
    drying the grains;
    evacuation to the grains;
    spinning the grains produced in the step of granulating.

6. The recycling method of waste fishnet of claim 5, wherein during the step of mixing, the fishnet granules is of 70% by weight, and nylon-66 is of 30% by weight.

7. The recycling method of waste fishnet of claim 5, wherein the waste fishnet is composed mainly of nylon-6.

8. The recycling method of waste fishnet of claim 5, further including a step of removing metal impurities between the steps of removing large impurities and chopping; during the step of removing metal impurities, metals are detected by a metal detector and are then removed.

9. The recycling method of waste fishnet of claim 5, wherein during the step of chopping, the waste fishnet is chopped into shreds whose diameters are smaller than 10 mm.

10. The recycling method of waste fishnet of claim 5, wherein during the step of cleaning, a drum washing machine is used to carry out cleaning operation.

* * * * *